Nov. 18, 1969     L. J. BRADT     3,478,697
TOW TRUCK SYSTEM AND TRUCK THEREFOR
Filed April 24, 1967
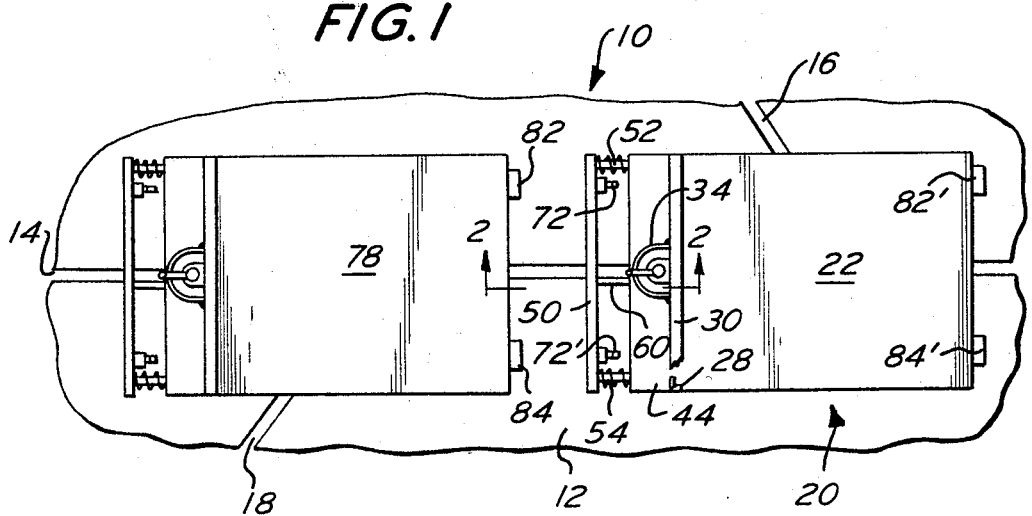
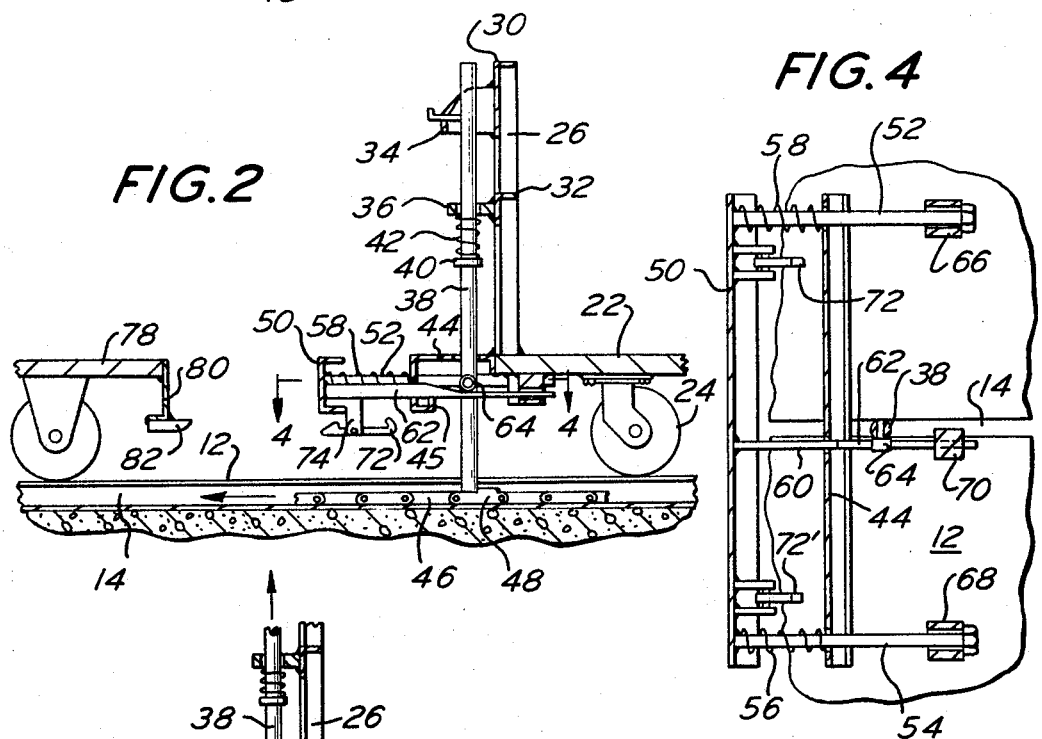
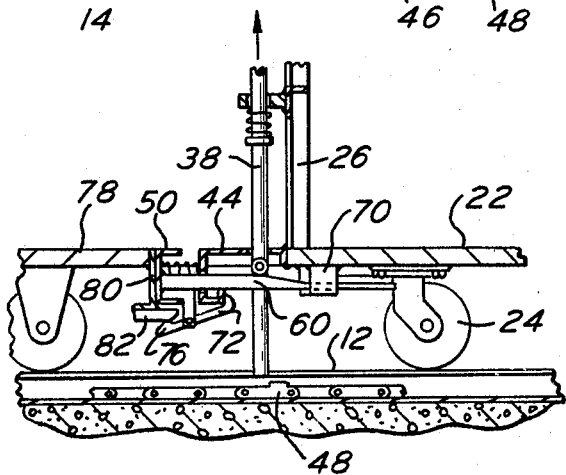
INVENTOR.
LYNN J. BRADT
BY Sedal & Gonda
ATTORNEYS.

United States Patent Office 3,478,697
Patented Nov. 18, 1969

3,478,697
TOW TRUCK SYSTEM AND TRUCK THEREFOR
Lynn J. Bradt, Easton, Pa., assignor to SI Handling Systems, Inc., Easton, Pa., a corporation of Pennsylvania
Filed Apr. 24, 1967, Ser. No. 633,163
Int. Cl. B61b 9/00; B61c 11/02
U.S. Cl. 104—172
8 Claims

ABSTRACT OF THE DISCLOSURE

The present invention relates to a tow truck system of the type in which a dependent tow pin on the cart engages a movable chain in a main guide slot. A front bumper is provided which when engaged obstruction will act to lift the tow pin from engagement with the driving chain. A latch means is provided, in the instant case, on the front of the tow cart which is so interrelated with the tow pin that when the tow pin is raised by the front bumper the latch means interengages with a latch means on a preceding halted cart to maintain the tow pin in a raised position.

This invention relates to a tow truck system and a tow truck particularly constructed for use in the system.

The present invention is an improvement over the type of tow truck system generally disclosed in Patent 3,094,-944. In said patent, there is disclosed a tow truck system wherein tow trucks have a tow pin extending into a main guide slot in a reference surface for engagement with a conveyor means. The conveyor means propels the tow truck along the slot. The tow truck has a front bumper movably supported and associated with the tow pin to cause the tow pin to move out of engagement with the conveyor means when the bumper engages an obstruction. At the same time, movement of the bumper applies brakes associated with rear wheels.

Unless brakes are applied to the rear wheels simultaneously with the lifting of the tow pin out of engagement with the conveyor means, the bias on the front bumper will cause the truck to back away from the obstruction. When the truck backs away from the obstruction, the front bumper resumes its normal position and the tow pin drops downwardly into engagement with the conveyor means. Thereafter, the sequence of events repeats itself.

I have now found that it is possible to prevent the truck from backing away from the obstruction without providing brakes for the rear wheels of the truck. In accordance with this invention, a latch means is supported at the front end of the truck for engagement with the obstruction and retention of the bumper in its position wherein the tow pin is retained out of engagement with the conveyor means until the obstruction is moved. Thereafter, the bumper resumes its normal position and the tow pin moves down into engagement with the conveyor means so that the truck may resume its path along the main slot.

Generally the obstruction to the movement of a truck along the main slot is another truck in the system. It is conventional to have a large number of trucks associated with a particular system. Hence, the trucks of the present invention are provided with contact members at their rear end for cooperation with the latch means on the front end of the other trucks in the system.

The utilization of brakes for the rear wheels of the truck body has proven to be satisfactory. Nevertheless, such brakes are located on the underside of the platform on the tow truck. It is inconvenient to adjust or maintain the brakes without turning the tow truck on its side, thereby faciliating free access to the components of the brake system. Also, the use of brakes inherently requires a brake shoe or comparable element which is subject to wear and replacement. The latch means of the present invention offers advantages of easy access at the front end of the body of the tow truck, the elements are visible so that one can readily see whether or not they are properly functioning, and the elements of the latch means are less likely to wear out, thereby having a longer life span. In addition, the latch means of the present invention is substantially simpler than the brake system disclosed in the above-mentioned patent.

It is an object of the present invention to provide a novel tow truck system and tow truck usable therein.

It is an object of the present invention to provide a tow truck system wherein tow trucks which do not have a brake system associated with wheels thereon will not back away from an obstruction, thereby permitting the tow pin to descend into engagement with a conveyor means.

It is another object of the present invention to provide a tow truck having a novel latch means for retaining a movable bumper in engagement with an obstruction so as to maintain a tow pin out of engagement with a conveying means.

It is another object of the present invention to provide a novel tow truck having a latch means on a front end thereof for engagement with an obstruction and thereby preventing the truck from backing away from the obstruction due to a bias on a bumper of the truck.

It is another object of the present invention to provide a means for preventing a tow truck from backing away from an obstruction, which means is simple, visible, easy to maintain, inexpensive, and reliable.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a partial top plan view of a system in accordance with the present invention.

FIGURE 2 is a sectional view taken along the line 2—2 in FIGURE 1.

FIGURE 3 is a view similar to FIGURE 2 but illustrating the elements after the truck has engaged the obstruction.

FIGURE 4 is a sectional view taken along the lines 4—4 in FIGURE 2.

Referring to the drawing in detail, wherein like numerals indicate like elements, there is shown in FIGURE 1 a tow truck system designated generally as 10.

The system 10 includes a reference surface 12 such as a bore or the like having a main guide slot 14 therein. Shunt slots such as slots 16 and 18 intersect the main guide slot 14 at spaced points therealong. A tow truck 20 is provided with wheels 24 which are in rolling engagement with the reference surface 12. Truck 20 is adapted to be propelled along the main guide slot 14 as will be made clear hereinafter.

The truck 20 includes a genreally horizontal platform 22 having the wheels 24 connected to the bottom side thereof. At the front end of the platform 22, there is provided upright standards 26 and 28 at the corners. The standards 26 and 28 are connected at the top by a brace 30 and intermediate their ends by a strut 32.

A latch member 34 is supported by the brace 30. Latch member 34 is a curved plate having a contoured upper surface. A guide 36 is supported by the brace 32.

A tow pin 38 extends through the guide 36 and into the latch member 34. Tow pin 38 is provided with a handle adjacent its upper end which rests on the contoured surface of the latch member 34. While tow pin 38 may be gravity biased, it is often desirable to utilize a spring bias. Hence, there is illustrated a collar 40 on the tow pin 38 with a spring 42 extending between the collar and guide 36.

A guard 44 having a lip 45 projects from the platform 22. The tow pin 38 extends through a hole in the horizontally disposed portion of guard 44. As illustrated more clearly in FIGURE 2, the lower end of the tow pin 38 extends into the main slot 14 and engages a pusher 48 of a conveyor means 46. Conveyor means 46 is preferably comprised of a plurality of links having a pusher 48 at spaced points therealong with the pusher 48 forming one of the links. A wide variety of conveyor means may be utilized. Per se, the conveyor means forms no part of the present invention and therefore a further description of the same is not deemed necessary.

The truck 20 is provided with a bumper 50 in front of guard 44. Bumper 50 is movably supported for movement toward and away from the tow pin 38. Such movement of the bumper 50 may be attained by a pivotable support for the bumper.

In the illustrated embodiment, the bumper 50 is reciprocably supported by means of support and guide rods 52 and 54. Rods 52 and 54 extend through apertures in the guard 44. A spring 56 is disposed around rod 44 between bumper 50 and guard 44. A spring 58 is disposed around rod 52 between bumper 54 and guard 44. The springs 56 and 58 bias the bumper 50 to a forward position.

A shaft 60 extends rearwardly from the bumper 50 through a hole in the guard 44. The longitudinal axis of shaft 60 is adjacent the center of the truck 22 so that a cam surface 62 on shaft 60 will be in rolling engagement with a roller 64 on the tow pin 38. As the bumper 50 moves rearwardly, cam surface 62 causes the tow pin 38 to move upwardly out of engagement with the pusher 48. At the same time, springs 56 and 58 are compressed.

Bushings 66 and 68 are provided on the underside of body 22 to facilitate guiding the rods 52 and 54 as illustrated more clearly in FIGURE 4. A limit stop for the forward position of the bumper 50 is attained by way of a nut on the ends of the rods 52 and 54 which in turn engage the bushings 66 and 68. Other equivalent devices may be utilized such as an adjustable collar on the rods adapted to engage the guard 44. If desired, the rods 52 and 54 may be provided with an adjustable collar for adjusting the tension on the springs 56 and 58. The springs 56 and 58 need not be disposed along that portion of the rods 52 and 54 between the bumper 50 and guard 44. If desired, the springs 56 and 58 may be transposed so as to be located between the guard 44 and the bushings 66 and 68.

A bushing 70 is provided for receiving the shaft 60 and guiding the same for movement in a direction along its longitudinal axis. If desired, the truck 20 may be provided with trip rods and a support for the same, as illustrated in the above-mentioned patent, for selectively determining the particular shunt slot to which the truck 10 is to be dispatched. The trip rods are a means for actuating a control at the intersection of the main slot and the paritcular shunt slot to which the truck is to be dispached. For purposes of clarity of illustration, the trip rods and their support together with the means for raising and lowering the tow pin have not been illustrated.

A latch means is supported at the front end of the truck 20 for engagement with an obstruction and retention of the bumper 50 in its position wherein the tow pin 38 is retained out of engagement with the conveyor means 46 until the obstruction is moved so as to no longer block the path of movement of the truck 20 along the main guide slot 14. Such latching means includes a pair of latches 72 and 72'. The latches are identical. Hence, only latch member 72 will be described in detail.

Latch 72 is provided with a hook at its rear end for cooperation with lip 45 on the guide 44. An enlarged protrusion is provided at the other end 76 of the latch 72. Latch 72 is pivotally supported intermediate its ends by a bracket 74 depending from the bumper 50.

An obstruction 78 is provided along the main guide slot 14. As illustrated, the obstruction 78 is another truck identical with truck 20. Truck 78 includes a rear plate 80 having rearwardly directed contact members 82 and 84. The contact members 82 and 84 are positioned so that a cam surface thereon will engage one of the protrusions on the latches 72 and 72', respectively. Contact with the members 82 and 84 causes the latches 72 and 72' to pivot. Normally, the hook at the rear end of the latches 72 and 72' is unable to engage with the lip 45 as shown more clearly in FIGURE 2. However, when the truck 20 engages the truck 78 the bumper 50 has moved to the rear for a sufficient distance so that the hooks at the rear ends of the latches 72 and 72' engage the lip 45 thereby preventing the truck 20 from backing up. Hence, the tow pin 38 is retained in a position out of engagement with the pusher 48 on the conveyor 46 as shown more clearly in FIGURE 3. A truck 20 and truck 78 will remain in the position illustrated in FIGURE 3 until truck 78 is moved so that it no longer blocks the path of movement of truck 20 along the main guide slot 14.

The obstruction to movement of the truck 20 need not be another truck. Instead, the obstruction can be a pedestrian who is generally a worker in the warehouse area within which the system 10 is installed. Alternatively, the obstruction may be an upright rod member mounted for movement into and out of the reference surface 10 and selectively movable from a remote location when it is desired to cause any particular truck to stop. Such upright rod member will have to be located so that it will be aligned with at least one of the latches 72 and 72', and thereby perform the function of plate 80 as well as member 82.

When the obstruction to the movement of truck 20 is removed, latches 72 and 72' will resume a horizontal disposition as illustrated in FIGURE 2. Thereafter, the springs 56 and 58 will expand thereby moving the bumper 50 to the position illustrated in FIGURE 2. The tow pin 38 will descend to a position wherein the next pusher 48 on the conveyor means 46 will again propel the truck 20 along the main slot 14.

In view of the above and the present state of the art to which the present invention pertains, a more detailed statement of operation is not deemed necessary.

The present invention may be embodied in other specific forms without departing from the spirit or essential attributes thereof and, accordingly, reference should be made to the appended claims, rather than to the foregoing specification.

I claim:

1. In a tow truck system wherein a tow truck has a tow pin extending into a main guide slot in a reference surface for engagement with a conveyor means for propelling the truck along the slot, said truck having a front bumper movably supported and associated with the tow pin to cause the tow pin to move out of engagement with the conveyor means when the bumper engages an obstruction, the improvement comprising a latch means supported on the front end of the truck for engagement with the obstruction and retention of the bumper in its position wherein the tow pin is retained out of engagement with the conveyor means until the obstruction is moved so as to no longer block the path of movement of the truck along the main guide slot.

2. In a system in accordance with claim 1 wherein said latch means includes a pair of latches pivotably supported at the front end of the truck between the front face of the bumper and the body of the truck.

3. In a system in accordance with claim 2 including means for biasing the bumper in a direction away from the longitudinal axis of the tow pin, and said latch means rendering said bias ineffective when the latch means is in engagement with the obstruction.

4. In a system in accordance with claim 1 wherein said bumper is mounted for movement toward and away from the longitudinal axis of the tow pin, said latch means being supported by the bumper, said tow truck including a front guard, said guard having a surface for engagement with the latch means when the latch means is in engagement with the obstruction.

5. A tow truck comprising a truck body mounted on wheels for rolling engagement with a reference surface, an upright tow pin supported at a front end of said body, a front bumper movably supported forwardly of the tow pin for movement toward and away from the tow pin, means biasing said bumper away from said tow pin, means interconnecting the bumper and tow pin so that movement of the bumper toward the tow pin causes the tow pin to move upwardly, latch means for overcoming the bias of the bumper and retaining the bumper in a position wherein the tow pin is caused to remain in upward position so long as the bumper is in engagement with an obstruction, said latch means including one movably mounted latch supported in depending relation from the bumper.

6. A truck in accordance with claim 5 wherein said truck body includes a guard, said latch being positioned to interconnect the bumper and guard when the bumper engages an obstruction.

7. A truck in accordance with claim 6 wherein said latch is pivotably supported by said bumper and has a rearwardly extending hook portion for engagement with the guard.

8. A truck in accordance with claim 5 wherein said truck body has at least one rearwardly extending member adapted to contact a latch means on another truck, said member being spaced from the side surfaces of said truck body by a distance corresponding to the distance between said side surfaces and said latch means.

References Cited
UNITED STATES PATENTS 3,408,952  11/1968  Karlstrom ---------- 104—178

ARTHUR L. LA POINT, Primary Examiner

D. F. WORTH III, Assistant Examiner

U.S. Cl. X.R.

104—178